(12) United States Patent
Lin

(10) Patent No.: US 6,757,164 B2
(45) Date of Patent: Jun. 29, 2004

(54) POSITIONING UNIT FOR A COMPUTER HOUSING-AND-PERIPHERAL DEVICE ASSEMBLY

(75) Inventor: Chin-Tang Lin, Chu-Pei (TW)

(73) Assignee: Mitac International Corp., Hsinchu Hsien (TW)

( * ) Notice: Subject to any disclaimer, the term of this patent is extended or adjusted under 35 U.S.C. 154(b) by 102 days.

(21) Appl. No.: 10/269,221

(22) Filed: Oct. 11, 2002

(65) Prior Publication Data

US 2004/0070929 A1 Apr. 15, 2004

(51) Int. Cl.$^7$ ................................................. G06F 1/16
(52) U.S. Cl. .................. 361/685; 312/223.1; 248/27.3; 248/201
(58) Field of Search ................................ 361/683–686, 361/724–727; 312/223.1, 223.2; 439/928.1, 53, 152; 248/27.3, 65, 201

(56) References Cited

U.S. PATENT DOCUMENTS

| | | | | |
|---|---|---|---|---|
| 4,960,384 A | * | 10/1990 | Singer et al. | 439/155 |
| 5,828,547 A | * | 10/1998 | Francovich et al. | 361/685 |
| 6,069,789 A | * | 5/2000 | Jung | 361/685 |
| 6,396,686 B1 | * | 5/2002 | Liu et al. | 361/685 |
| 6,469,889 B1 | * | 10/2002 | Gan | 361/685 |
| 6,590,775 B2 | * | 7/2003 | Chen | 361/725 |

* cited by examiner

Primary Examiner—Lisa Lea-Edmonds
(74) Attorney, Agent, or Firm—Merchant & Gould, P.C.

(57) ABSTRACT

A positioning unit is provided for a computer housing-and-peripheral device assembly that includes a computer housing and a peripheral device. The positioning unit includes a positioning member disposed between the peripheral device and the computer housing, and including a thin plate that is stamped to form a bent spring arm having a first section which extends toward the casing, and a second section which bends from the first section and which extends toward the computer housing.

4 Claims, 2 Drawing Sheets

POSITIONING UNIT FOR A COMPUTER HOUSING-AND-PERIPHERAL DEVICE ASSEMBLY

BACKGROUND OF THE INVENTION

1. Field of the Invention

This invention relates to a positioning unit for a computer housing-and-peripheral device assembly that includes a computer housing and peripheral devices.

2. Description of the Related Art

Personal computers normally include a computer housing and peripheral devices, such as an optical disk drive, a floppy disk drive, and a hard disk drive, mounted in the computer housing. Conventionally, each of the aforesaid peripheral devices is mounted in the computer housing via screw means. As such, it is relatively inconvenient to mount or dismount the peripheral devices in the computer housing through tightening or loosening of the screw means.

SUMMARY OF THE INVENTION

Therefore, it is an object of the present invention to provide a positioning unit for mounting the peripheral devices in the computer housing without requiring the tightening of screw means.

According to the present invention, there is provided a positioning unit for a computer housing-and-peripheral device assembly that includes a computer housing and a peripheral device. The peripheral device includes a casing with two opposite side walls. The computer housing has two opposite side walls that are formed with a pair of guiding grooves for receiving the side walls of the casing. The positioning unit comprises: a pair of positioning members, each of which is adapted to be disposed between a respective one of the side walls of the casing and a respective one of the side walls of the computer housing, and each of which includes a thin plate that is stamped to form a peripheral wall with an inner face confining a frame space, and a pair of opposing bent spring arms which extend oppositely from the inner face into the frame space. Each of the bent spring arms has a first section that is adapted to extend toward the respective one of the side walls of the casing, and a second section that bends from the first section to form an apex therebetween and that is adapted to extend toward the respective one of the side walls of the computer housing so as to permit elastic abutment of the apex against the respective one of the side walls of the casing and elastic abutment of the second section against the respective one of the side walls of the computer housing when the casing is mounted in the computer housing, thereby limiting sidewise movement of the casing in the computer housing.

BRIEF DESCRIPTION OF THE DRAWINGS

In drawings which illustrate an embodiment of the invention.

DETAILED DESCRIPTION OF THE PREFERRED EMBODIMENT

Figure 1:
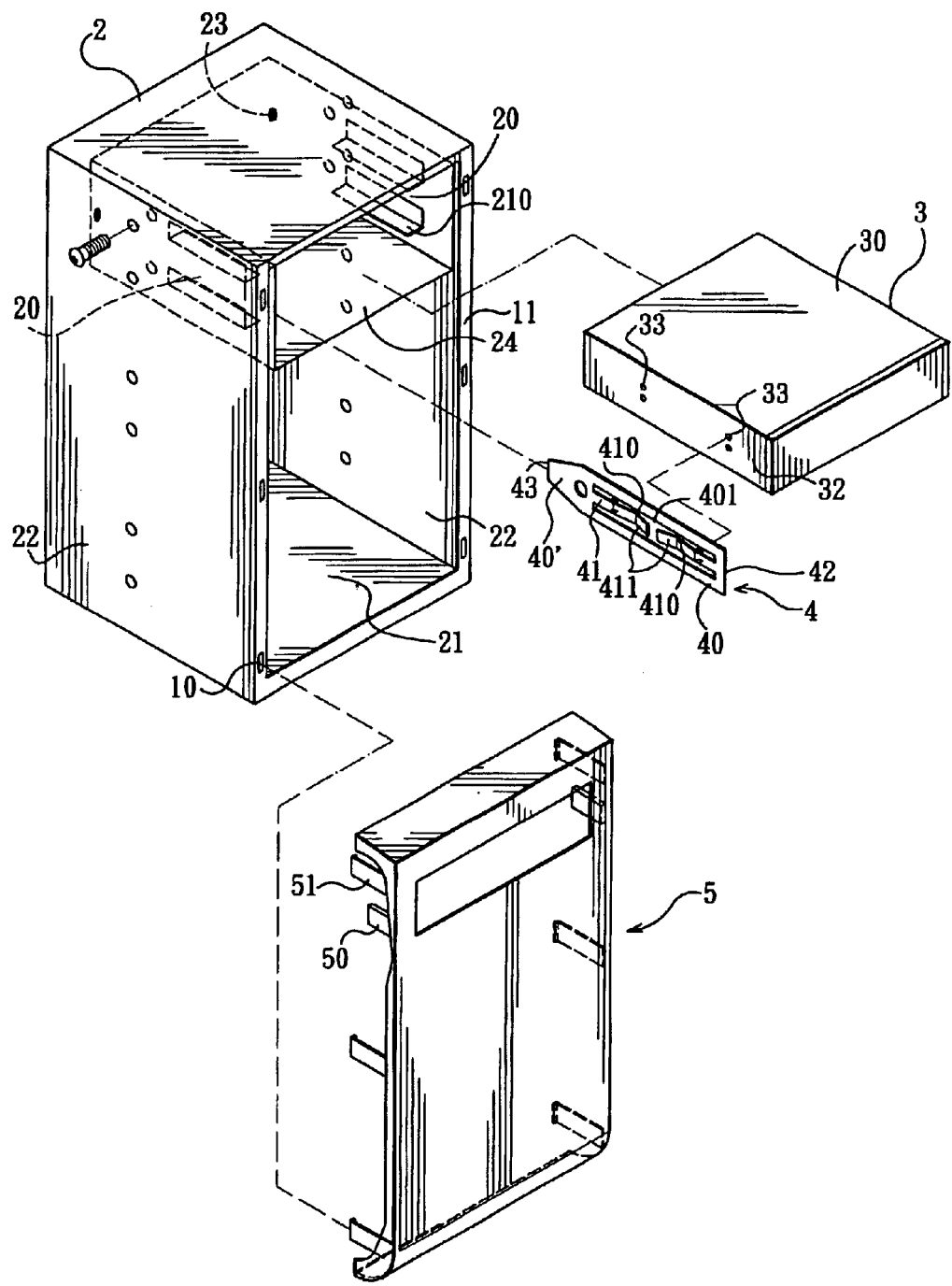
FIG. 1 is an exploded perspective view of a computer housing-and-peripheral device assembly embodying, this invention.
Figure 2:
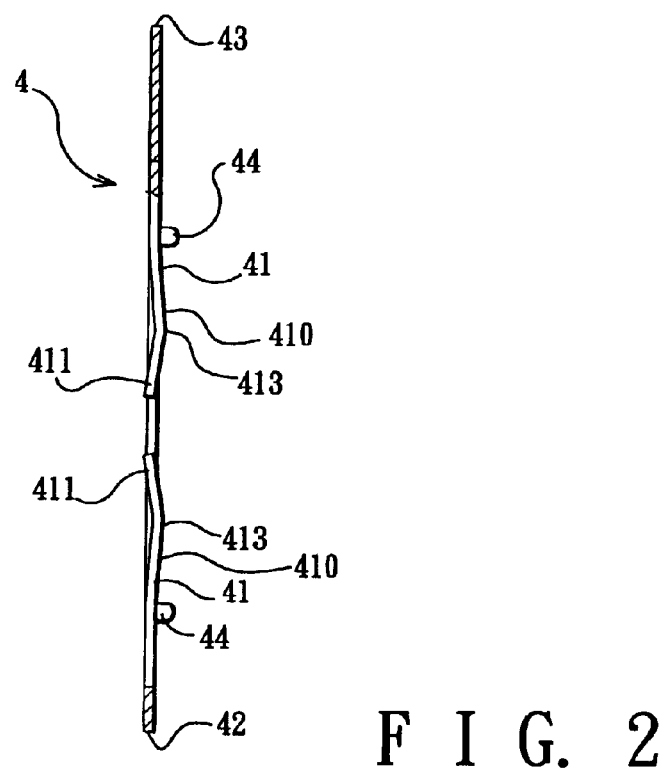
FIG. 2 is a sectional view of a positioning member of the computer housing-and-peripheral device assembly of FIG. 1.
Figure 3:
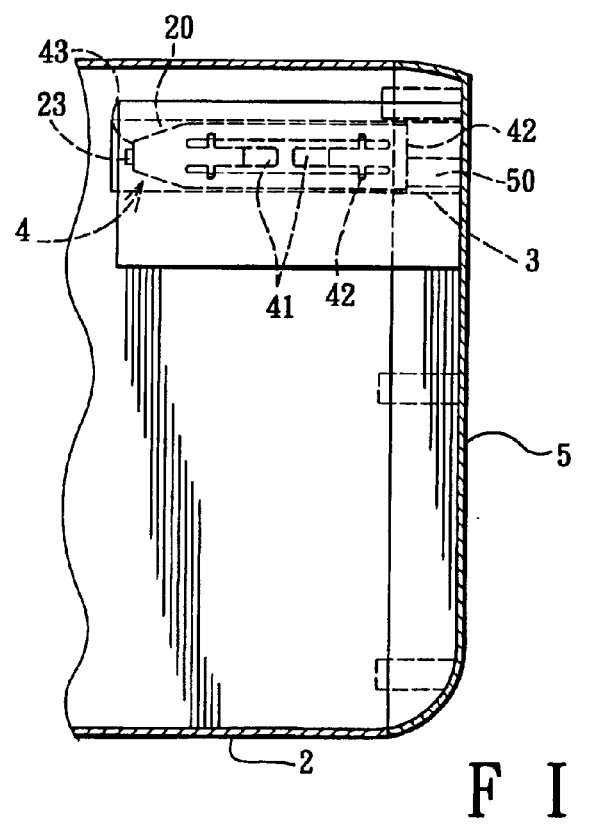
FIG. 3 is a fragmentary sectional view of the computer housing-and-peripheral device assembly of FIG. 1.

FIGS. 1 to 3 illustrate a computer housing-and-peripheral device assembly embodying this invention.

The computer housing-and-peripheral device assembly includes: a peripheral device 3 including a casing 30 with two opposite side walls 32; a computer housing 2 defining an inner space 21 and having a front wall 11 formed with a front opening 24 for insertion of the peripheral device 3 therethrough into the inner space 21, and two opposite side walls 22 that are formed with a pair of opposing guiding rails 210 projecting into the inner space 21 and cooperatively defining a pair of guiding grooves 20 for receiving the side walls 32 of the casing 30 and for permitting sliding movement of the casing 30 along the guiding rails 210; and a positioning unit including a pair of positioning members 4 (only one of the positioning members 4 is shown), each of which is disposed between a respective one of the side walls 22 of the computer housing 2 and a respective one of the side walls 32 of the casing 30, and each of which is formed with a pair of opposing bent spring arms 41 that elastically abut against the respective one of the side walls 22 of the computer housing 2 and the respective one of the side walls 32 of the casing 30 so as to limit sidewise movement of the casing 30 in the inner space 21.

Each of the side walls 32 of the casing 30 is formed with a pair of retaining holes 33. The computer housing 2 is further formed with a pair of opposing stoppers 23 respectively projecting from the side walls 22 of the computer housing 2 into the inner space 21 and disposed rearwardly of the guiding rails 210. Each of the positioning members 4 includes a thin plate 40 having opposite front and rear ends 42, 43, and formed with the bent spring arms 41 and a pair of retaining protrusions 44 that respectively extend into the retaining holes 33 of a respective one of the side walls 32 of the casing 30 when the casing 30 is inserted into the guiding grooves 20. A front cover 5 is detachably mounted on the front wall 11 of the computer housing 2, and is formed with a pair of opposing fingers 50, each of which projects therefrom toward a respective one of the positioning members 4. Each of the fingers 50 abuts against the front end 42 of the thin plate 40 of the respective one of the positioning members 4, and each of the stoppers 23 abuts against the rear end 43 of the thin plate 40 of a respective one of the positioning members 4 when the casing 30 is inserted into the guiding grooves 20 and the front cover 5 is mounted on the computer housing 2 so as to limit frontward and rearward movements of the casing 30 in the inner space 21. A plurality of retaining inserts 51 project from the front cover 5, and respectively extend into retaining holes 10 formed in the front wall 11 of the computer housing 2 so as to permit mounting of the front cover 5 on the computer housing 2.

The thin plate 40 of each of the positioning members 4 is stamped to form a peripheral wall 40' with an inner face 401 confining a frame space 402, and the bent spring arms 41 which extend oppositely from the inner face 401 into the frame space 402. Each of the bent spring arms 41 has a first section 410 that extends toward the respective one of the side walls 32 of the casing 30, and a second section 411 that bends from the first section 410 to form an apex 413 therebetween and that extends toward the respective one of the side walls 22 of the computer housing 2 so as to permit elastic abutment of the apex 413 against the respective one of the side walls 32 of the casing 30 and elastic abutment of the second section 411 against the respective one of the side walls 22 of the computer housing 2 when the casing 30 is mounted in the computer housing 2, thereby limiting sidewise movement of the casing 30 in the computer housing 2.

With the inclusion of the positioning unit of this invention, the aforesaid screw means required in the prior art for mounting the peripheral devices in the computer housing can be eliminated.

With the invention thus explained, it is apparent that various modifications can be made without departing from the spirit of the present invention. It is therefore intended that the invention be limited only as recited in the appended claims.

I claim:

1. A positioning unit for a computer housing-and-peripheral device assembly that includes a computer housing and a peripheral device, the peripheral device including a casing with two opposite side walls, the computer housing having two opposite side walls that are formed with a pair of guiding grooves for receiving the side walls of the casing, said positioning unit comprising:

a pair of positioning members, each of which is adapted to be disposed between a respective one of the side walls of the casing and a respective one of the side walls of the computer housing, and each of which includes a thin plate that is stamped to form a peripheral wall with an inner face confining a frame space, and a pair of opposing bent spring arms which extend oppositely from said inner face into said frame space, each of said bent spring arms having a first section that is adapted to extend toward the respective one of the side walls of the casing, and a second section that bends from said first section to form an apex therebetween and that is adapted to extend toward the respective one of the side walls of the computer housing so as to permit elastic abutment of said apex against the respective one of the side walls of the casing and elastic abutment of said second section against the respective one of the side walls of the computer housing when the casing is mounted in the computer housing, thereby limiting sidewise movement of the casing in the computer housing.

2. A computer housing-and-peripheral device assembly comprising:

a peripheral device including a casing with two opposite side walls;

a computer housing defining an inner space and having a front wall formed with a front opening for insertion of said peripheral device therethrough into said inner space, and two opposite side walls that are formed with a pair of opposing guiding rails projecting into said inner space and cooperatively defining a pair of guiding grooves for receiving said casing and for permitting sliding movement of said casing along said guiding rails; and a positioning unit including a pair of positioning members, each of which is disposed between a respective one of said side walls of said computer housing and a respective one of said side walls of said casing, and each of which is formed with a bent spring arm that elastically abuts against the respective one of said side walls of said computer housing and the respective one of said side walls of said casing so as to limit sidewise movement of said casing in said inner space.

3. The assembly of claim 2, wherein each of said side walls of said casing is formed with a retaining hole, said computer housing being further formed with a pair of opposing stoppers respectively projecting from said side walls of said computer housing into said inner space and disposed rearwardly of said guiding rails, each of said positioning members including a thin plate having opposite front and rear ends and formed with said bent spring arm and a retaining protrusion that extends into said retaining hole of a respective one of said side walls of said casing when said casing is inserted into said guiding grooves, said assembly further comprising a front cover that is detachably mounted on said front wall of said computer housing and that is formed with a pair of opposing fingers, each of which projects therefrom toward a respective one of said positioning members, each of said fingers abutting against said front end of said thin plate of the respective one of said positioning members, and each of said stoppers abutting against said rear end of said thin plate of a respective one of said positioning members when said casing is inserted into said guiding grooves and said front cover is mounted on said computer housing so as to limit frontward and rearward movements of said casing in said inner space.

4. The assembly of claim 3, wherein said thin plate of each of said positioning members is stamped to form said bent spring arm and a peripheral wall having an inner face surrounding said bent spring arm, said bent spring arm having a first section extending from said inner face of said peripheral wall toward a respective one of said side walls of said casing, and a second section bent from said first section to form an apex therebetween and extending toward a respective one of said side walls of said computer housing so as to permit elastic abutment of said apex against the respective one of said side walls of said casing and elastic abutment of said second section against the respective one of said side walls of said computer housing.

* * * * *